Dec. 9, 1952　　　　J. C. CRIVELLA　　　　2,621,070
HORSE VAN

Filed Aug. 29, 1947　　　　　　　　　　　　6 Sheets-Sheet 2

Inventor
JOSEPH C. CRIVELLA
By
Attorney

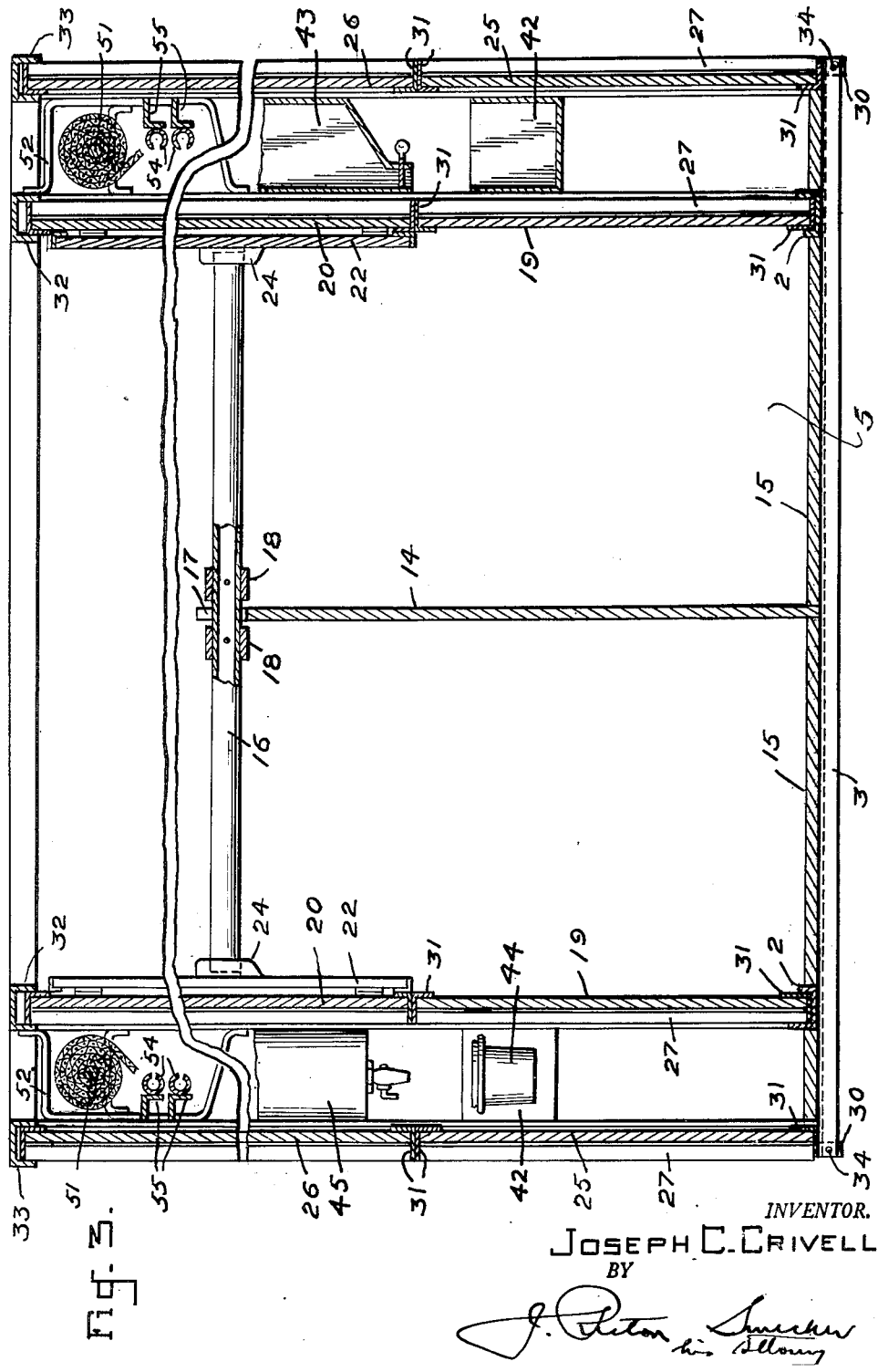

Dec. 9, 1952  J. C. CRIVELLA  2,621,070
HORSE VAN
Filed Aug. 29, 1947  6 Sheets-Sheet 4
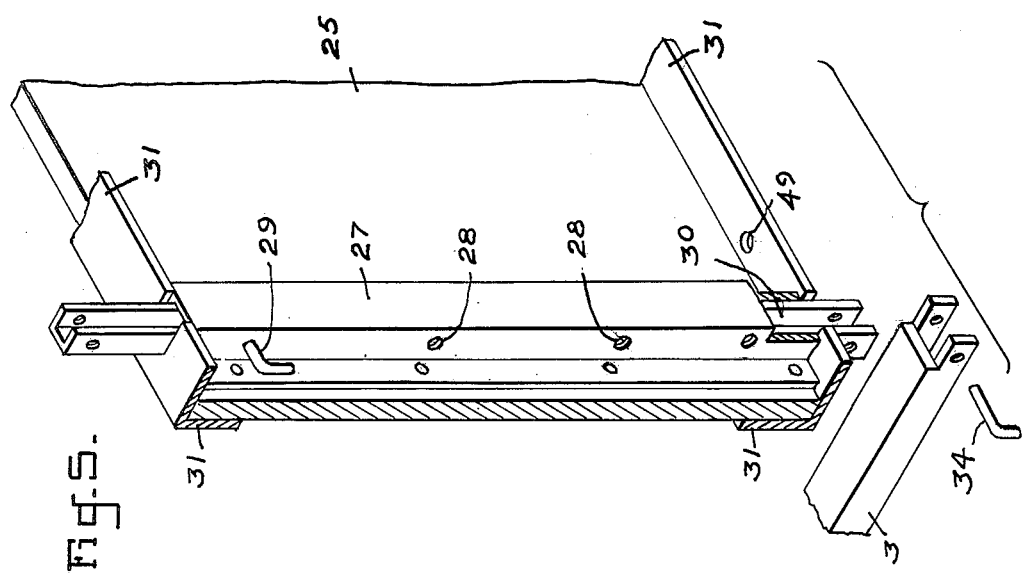
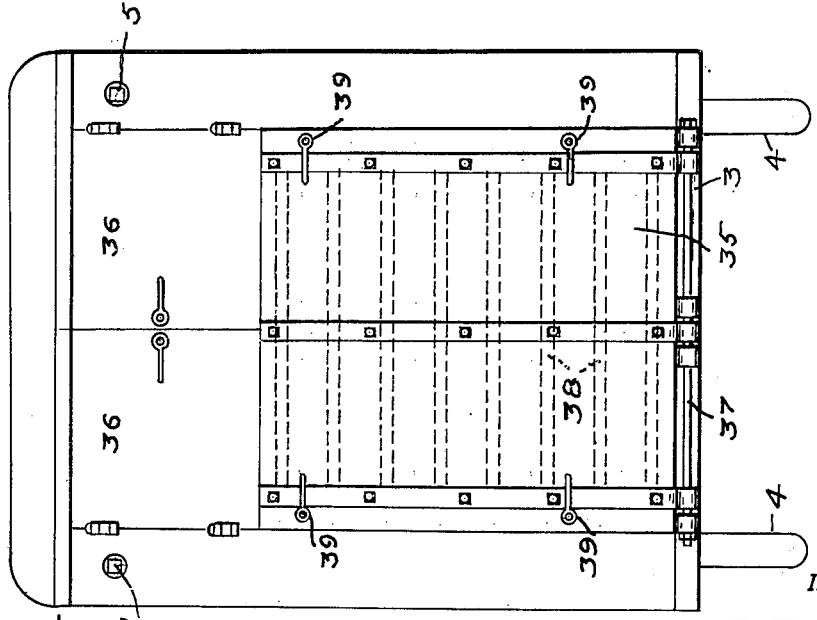
INVENTOR.
JOSEPH C. CRIVELLA Dec. 9, 1952 J. C. CRIVELLA 2,621,070
HORSE VAN
Filed Aug. 29, 1947 6 Sheets-Sheet 5
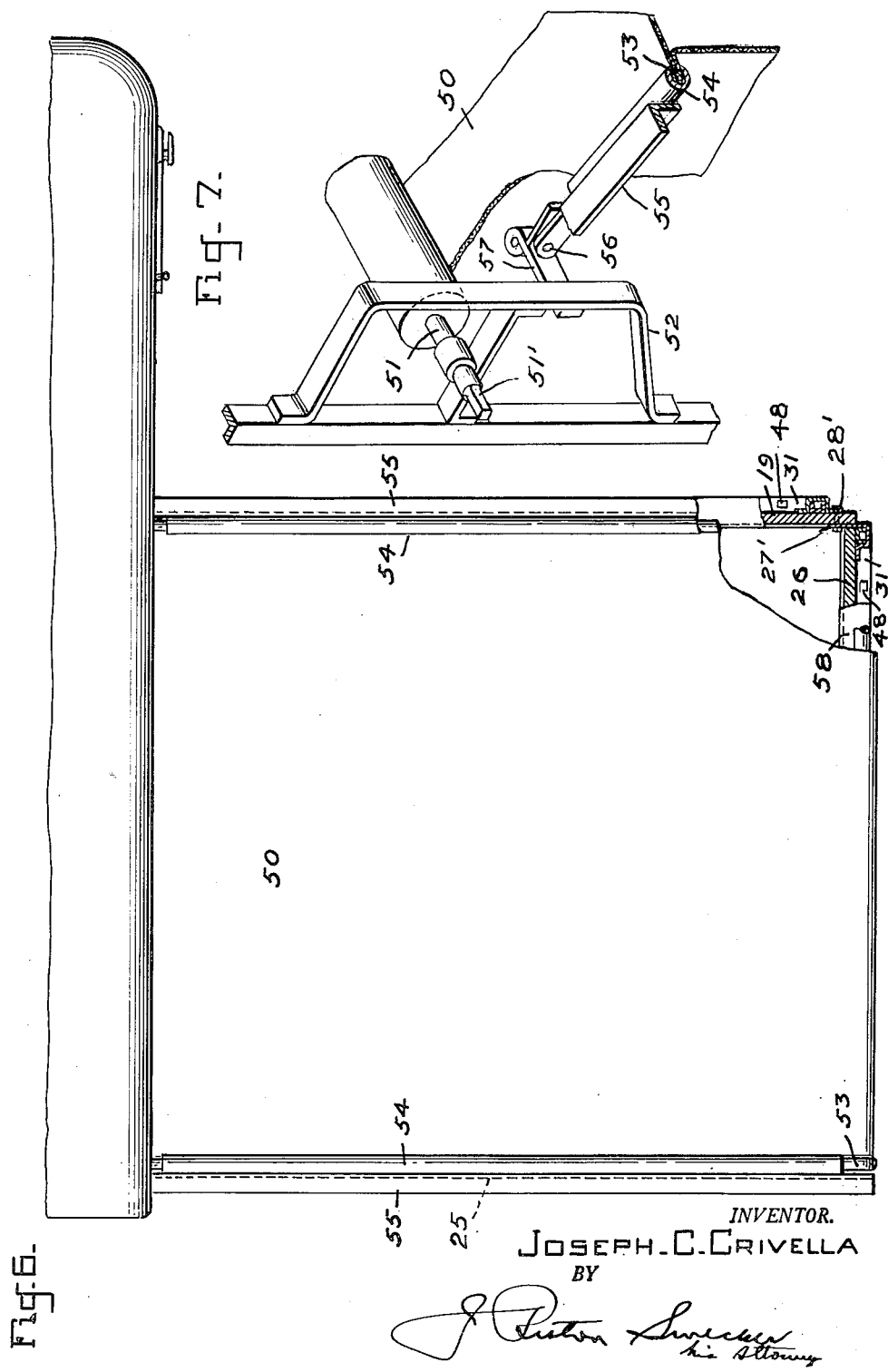
INVENTOR.
JOSEPH C. CRIVELLA
BY Dec. 9, 1952 J. C. CRIVELLA 2,621,070
HORSE VAN
Filed Aug. 29, 1947 6 Sheets-Sheet 6
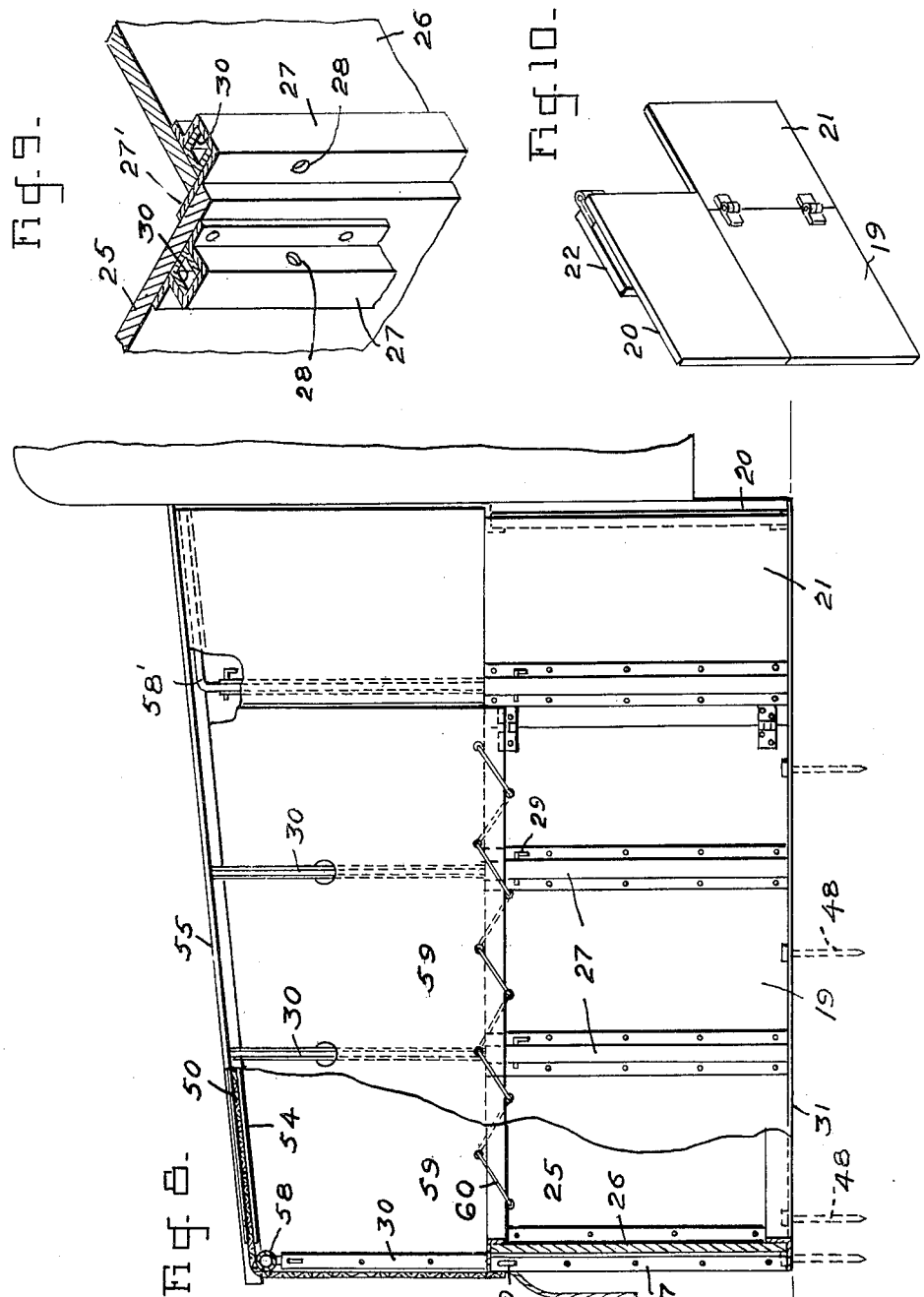
INVENTOR.
JOSEPH C. CRIVELLA
BY Patented Dec. 9, 1952

2,621,070

UNITED STATES PATENT OFFICE 2,621,070

HORSE VAN

Joseph C. Crivella, Washington, D. C.

Application August 29, 1947, Serial No. 771,341

12 Claims. (Cl. 296—24)

1

This invention relates to improvements in horse vans, of the character adapted particularly to be used as a trailer or to be drawn in any suitable manner for the transportation of a horse or horses from point to point, and especially where it is desired to provide an exercise and feeding enclosure for the animals outside the van.

In the handling of racing and show horses, it is necessary to transport the animals to respective locations or tracks for show or racing purposes, and the horses are kept in stalls in the barns at the track during the engagement. Frequently, not sufficient stalls are available for all of the horses to be shown or to race, which makes it necessary that some of the horses be housed remote from the point of engagement or in unsatisfactory quarters.

One object of this invention is to provide a van that may be used for transporting horses from place to place, and also convertible to use as an enclosure or stall for confining the animals at the point of engagement where they may have sufficient room for exercise, feeding and handling, and without the necessity for confining the animals in the stalls of the barns usually provided.

A further object of the invention is to improve the construction of vans adapted for the transportation of various products, to provide for the hauling of one or more horses confined therein with provisions not only for confining the horse or horses in comfort and safe condition during transportation, with adequate provisions for watering and feeding the animals and caring for them to any extent necessary, and also convertible to form a stall or stalls at a point where it is desired to remove the horse or horses from the van for rest, show, or racing purposes.

Still another object of the invention is to improve the construction of the van to enable this to be used as a trailer drawn by an automobile, and to provide not only transportation for a horse or horses, but also living quarters for an attendant both during transportation and at the point of engagement when the horse or horses may be housed outside the trailer.

These objects may be accomplished, according to one embodiment of the invention by constructing the van in the form of a trailer with provision for confining therein one or more horses, as desired, and according to the size of the van that may be used. For instance, where two horses are to be confined, a partition may be provided lengthwise of the trailer body to separate the animals and held in place by suitable rails supported on the sides of the van. Provision is made in the side walls to form receptacles for feed, including grain and hay, as well as water, so that the animals may have access thereto during transportaiton, and thus be hauled over long distances without serious difficulty or discomfort, and also without the necessity for making special arrangements for stop-over en route.

It is preferred, according to this embodiment of the invention to provide in the construction of the van or trailer for the erection of a temporary enclosure at the point of engagement or point of stop-over, into which the animal may be directed from the van to form a stall for feeding, care and exercise either en route or at the point of the show or racing. This may be accomplished by providing removable sides on the walls of the van which may be disconnected therefrom and set up or erected beside the van, thereby to form a stall or enclosure for the animal. Provision may be made for access by the animal to the feed and water in the van when thus housed in the enclosure or stall thereby.

When the device is constructed in the form of a trailer, it is also preferable to provide thereon suitable living quarters for an attendant, both during transportation of the animals and also at the point of engagement. Thus a small enclosure at one end of the trailer, preferably the front thereof, may be used to form living and sleeping accommodations for the attendant.

This embodiment of the invention is illustrated in the accompanying drawings, in which:

Fig. 3 is a cross section on the line 3—3 of Fig. 2;

Fig. 4 is a rear elevation thereof;

Fig. 5 is a detail partial disassembled perspective view with parts in section, showing one of the side panels;

Fig. 6 is a top plan view of a portion of the van and adjacent enclosure, with a part broken away and in section;

Fig. 7 is a detail perspective view of a portion of the mounting structure for the making of the enclosure;

Fig. 8 is a longitudinal section through the enclosure with a portion of the van in elevation;

Fig. 9 is a detail perspective view partly in section of the adjacent side panels connected to form an enclosure; and Fig. 10 is a detail perspective view of two of the panels in superposed relation.

Figure 1:
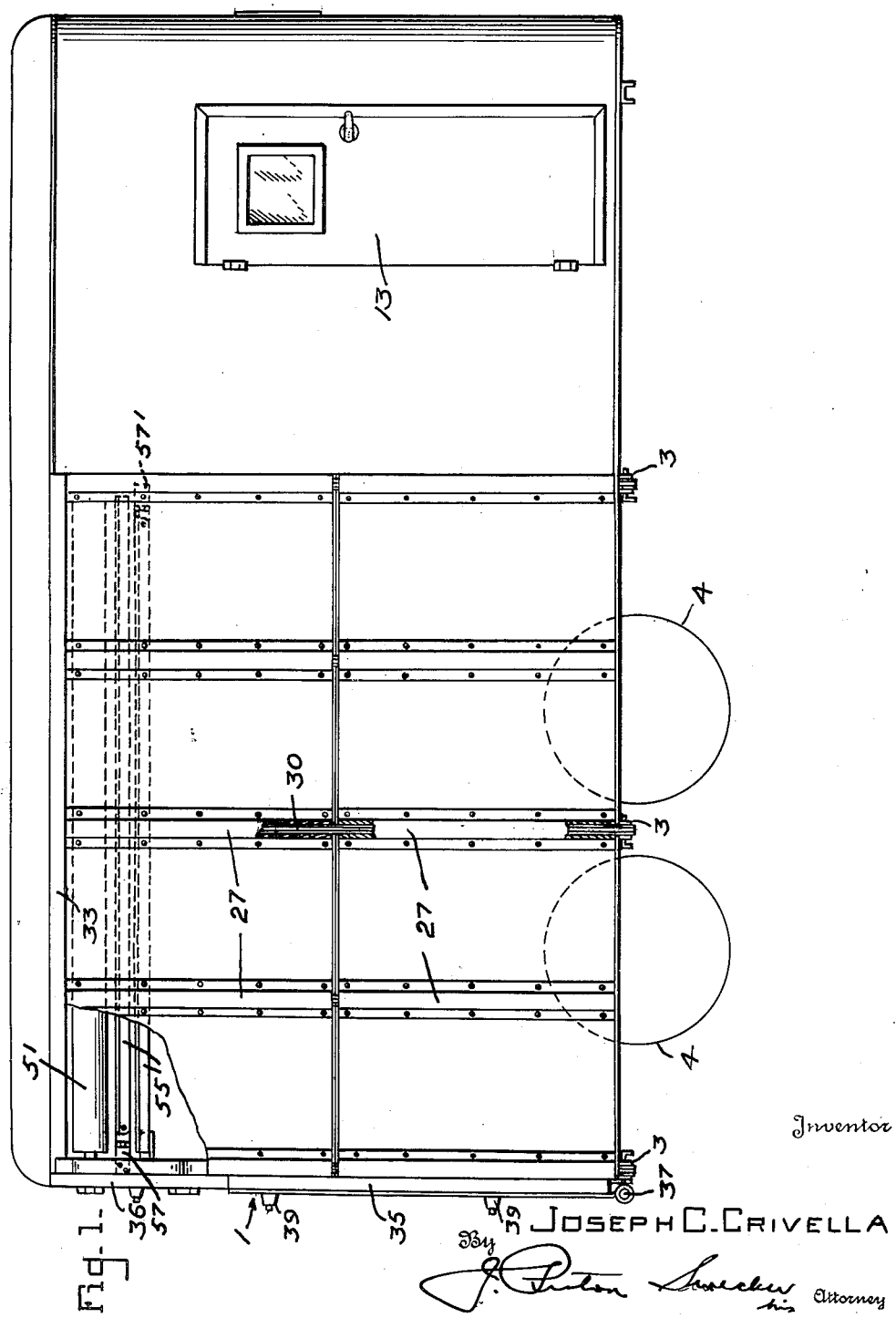
Fig. 1 is a side elevation of the van constructed according to the foregoing provisions, with parts broken away and in section.

The invention may be applied to any suitable form of vehicle is adaptable for the purpose, but is shown as applied to a vehicle trailer of the type customarily adapted to be drawn behind an automobile, merely for purpose of illustration. The details of the trailer structure and its draft means are omitted for clearness of illustration and because any suitable form thereof, may be used as desired.

The trailer body is designated generally by the numeral 1, and is shown as constructed of a chassis frame, including longitudinal frame bars 2 and cross bars 3 for bracing the longitudinal bars and coacting therein to form a rigid unitary support. This chassis frame forms a support for the frame structure and enclosing portions of the body 1, as will be understood in the art of trailer construction. Wheels are shown at 4, having the chassis frame 2 mounted thereon in any suitable manner.

In the form illustrated in the drawings, the van is shown as having enclosed compartments 5 and 6 in the respective opposite ends thereof, the compartment 5 forming an enclosure for a horse or horses, as desired, for the transportation thereof, while the compartment 6 forms living quarters for an attendant. These compartments are separated by a wall 7, having a door 8 therethrough for access by the attendant into the van compartment 5.

The living compartment 6 may be provided with suitable equipment for desired living accommodations, such as a bed or bunk 9, a stove 10, an ice box or refrigerator 11. A closet or enclosure is shown at 12 in one side of the compartment 6, within convenient reach of a door 13, which forms the entrance door to the compartment. The closet or enclosure 12 may be used for containing various articles needed for handling the horses, such as bridles, halters, robes, blankets, etc.

Figure 2:
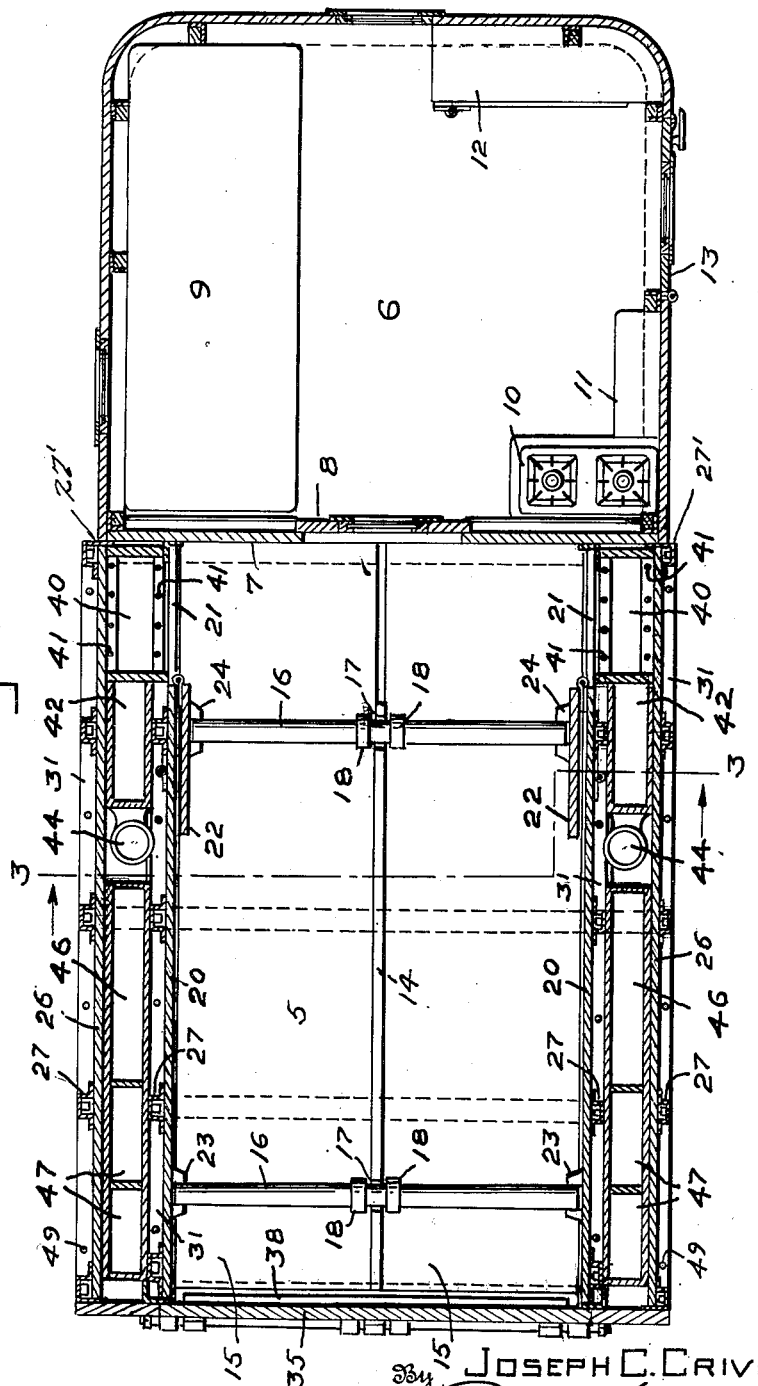
Fig. 2 is a horizontal sectional view therethrough.

In the form illustrated, the van compartment 5 is shown, merely for purpose of illustration, as adapted to accommodate two horses, although the number of horses to be accommodated therein may be varied to the extent permitted by the size and construction of the enclosure. The compartment 5 is divided by an upright partition 14, held in place by floor sections 15, which are shown as mounted upon the cross bars 3 of the chassis frame. The partition 14 is confined at its lower edge by the floor sections 15, being removable therefrom, while its upper edge is held in place by bars 16, spaced longitudinally of the partition as shown in Fig. 2, and removable from engagement therein. Each of the bars 16 is seated in notch 17, in the upper edge of the partition 14, being confined on opposite sides thereof by clamps 18 that surround the bar 16.

The partition 14 extends preferably throughout the major portion of the length of the van compartment 5, as shown in Fig. 2, and is used when it is desired to transport two horses, keeping them separate from each other. The bars 16 are spaced apart a sufficient distance along the partition to receive a horse between the bars on each side of the partition, and confining the horse against movement into engagement with either opposite end of the compartment 5.

The opposite sides of the van compartment 5 are formed by superposed panels generally designated at 19 and 20, which extend respectively throughout the major portion of the length of the compartment 5, but each of these panels 19 and 20 is provided with a door illustrated respectively at 21 and 22, in Fig. 10, at one end thereof, for a purpose hereinafter described. The body of the panel together with the door that forms an extension thereof when in closed position, constitute a side wall portion extending throughout the length of the compartment 5, along each opposite side thereof.

The panel 20 has a guide 23 on the inner face thereof which may be detachable, if desired, to receive one end of the rear most cross bar 16 and form a support therefor. A similar guide 24 is provided on the inner face of the door 22 in open position, as shown in Fig. 2, to receive the corresponding end of the forward cross bar 16. The guides 23 and 24 provide a support at both opposite ends of the cross bars 16, the opposite ends cooperating with the seats of these cross bars in the partition 14 to hold the cross bars rigidly in place and yet permitting their removal when the animals are removed from the van.

The panels 19 and 20 may be formed of any suitable or desired material, such as plywood, composition, sheet-metal, preferably aluminum, or other material suitable for the purpose. It is preferred that the material used be sufficiently light in weight, so that it may be handled readily and yet will have strength and stability for the desired purpose.

The panels 19 and 20 form the lateral side walls of the van compartment 5, as pointed out above, and are spaced from similar panels arranged in superposed relation at each side of the van, as designated at 25 and 26. The panels 25 and 26 are constructed like the panels 19 and 20, and a pair of such panels cooperate to form one wall for the van at each side of the compartment 5.

Each of these panels 19, 20, 25 and 26, preferably is stiffened by a plurality of upright channels 27, rigidly fixed by welding, riveting, or otherwise fastening the same to the outer face of the panel, there being a plurality of such channels spaced at intervals along the length of the panel, as shown in Fig. 2. Each channel 27, preferably is formed with openings 28 therethrough from side-to-side (Fig. 5), at least in the panels 19 and 25, to receive a pin 29, which will pass through registering holes in a supporting bar 30, extending upwardly through the channel 27. The bar 30 is of a length greater than the length of the channel 27, so that the ends thereof will project from the ends of the channel 27, as shown in Fig. 5.

Each opposite edge of each of the panels 19, 20, 25 and 26 has an angle bar 31, rigidly fixed thereto, to stiffen the edge of the panel, if needed, and to provide for upright support thereof, as shown in Figs. 3 and 5. The panels 19 and 20 are in superposed relation with each other and are mounted in bridging relation between one of the chassis frame bars 2, and a complementary frame bar 32. The panels 25 and 26 are also in superposed relation and detachably mounted on the projecting ends of the cross bars 3, between the latter and a corresponding top bar 33, as shown in Fig. 3.

These panels 19, 20, 25 and 26 are removable vertically from the vehicle structure by edgewise movement, when it is desired to set up an enclosure on one or both opposite sides of the van, as hereinafter described.

When the panels 25 and 26 are in place on the van, they are adapted to be locked in secure relation thereon by the bars 30, which serve both to connect the panels together and also to anchor the panels 25 at the bottom to the cross bars 3. The lower end of the bar 30 is connected by a pin 34, engaging through registering holes in the adjacent ends of the bars 3 and 30, to anchor these bars together, as shown in Fig. 5. The upper end of the bar 30 engages in the open lower end of the corresponding channel 27 on the panel 26, so as to secure the panels 25 and 26 together.

The back end of the van compartment 5 is provided with an end gate 35 for closing the lower portion thereof, and with doors 36 for closing the upper portion thereof, as shown in Fig. 4. The end gate 35 is hinged at 37 on a horizontal axis, so as to swing down to an inclined position with the free edge thereof resting on the ground to form a ramp for the entrance or exit of the horses to or from the compartment 5. Cleats are shown at 38 on the inner face of the door 35, not only to stiffen and reinforce the latter but also to insure traction and against slippage of the horse. Normally, the door 35 is retained in closed position by catches 39.

The space between the panels at each side of the van is adapted to form compartments for feed and other articles that may be needed. At the front end of this space and extending preferably throughout the height of the vehicle is a hay rack, generally designated at 40, having spaced bars 41, at each opposite side thereof, to permit access of the animal thereto for feed purpose. The inner side of the hay rack 40 is accessible when the doors 22 are moved to the positions shown in Fig. 2, which is the transport position, while the outer side is then closed by the panel 26. The outer side may be exposed, however, when the panel 26 is removed, to permit feeding of the horses from the outside when the horse is enclosed in a space externally of the conveyance.

Adjacent the hay rack 40 is mounted a feed box 42, as shown in Figs. 2 and 3, and the latter may have a storage bin 43, superposed thereabove, if desired, as shown at the right in Fig. 3. Access to this feed box 42 may be had from the outside of the conveyance upon removal of the panels 25 and 26.

Adjacent the feed box 42, is shown a water receptacle or bucket 44 which may be supplied with water from a superposed storage tank 45, as illustrated at the left in Fig. 3.

Additional compartments are shown in Fig. 2 at 46 and 47, the compartment 46 forming a tack box, while that at 47 is adapted to receive the usual implements needed, such as a fork, rake, broom, etc.

The panels are adapted to be removed from the respective positions shown in Figs. 1 to 3, to form a stall or enclosure beside the van 1, as indicated in Figs. 6 and 8. This enclosure is formed by three of the four panels upon removal from the van, while the fourth panel is set in place, as shown in Fig. 8, upon the ground to form a cover for the wheels and adjacent side of the conveyance. Such an enclosure may be formed at each side of the van for the respective horses.

In removing the animals from the van compartment 5, the door 35 is lowered with its upper edge resting on the ground. The rearward bar 16 is removed. Then the horses may be backed out. Then upon removal of the forward cross bar 16 and the partition 14, the panels are removable readily.

The panels 19 and 20 may be lifted in the channels 2 and 32 until the lower edge of the panel 19 clears the edge of the channel 2. Then the panel 19 will swing inward out of the channel, and the panel 20 dropped.

The panels 25 and 26 are removable laterally from the frame of the vehicle, upon removal of the pins 34. Then the panels are tilted outward and dropped, detaching these from the van.

The panels 19 and 25 are set up on opposite sides of the enclosure, adjacent opposite ends of the van portion of the conveyance, with the angle bars 31, resting directly on the ground. These panels are adapted to be secured in place by pegs 48 which are inserted through orifices 49, in the angle bars 31, as shown in Fig. 5. Then the panel 26 forms the connection between the outer edges of the panels 19 and 25, and closes the outer side of the stall or enclosure for the horse, this panel being also secured to the ground by pegs 48, driven through similar orifices in the flanges or angle bars 31.

The edges of the panel 26 are secured to the adjacent panels 19 and 25, by an overlapping relation, substantially as indicated in Fig. 9. One of the channels 27 at each end of the panel 26 has an inturned flange 27' against which the adjacent edge of the panel 19 or 25 abuts and the parts may be secured together by bolting or otherwise, as indicated at 28' in Fig. 6. The door 21 in the panel 19 forms an entrance door into the enclosure.

The enclosure may be covered with a fabric top, generally as indicated at 50, formed of a sheet of water-proof material, such as tarpaulin, that may be drawn outward from a roll 51 (see Figs. 3 and 7), to cover the enclosure. The roll 51 is mounted on a frame structure generally indicated at 52 which forms a part of the frame of the conveyance. The roll 51 has a shaft 51' that may be square or hexagonal to receive a wrench for turning the roll, as shown in Figs. 4 and 7.

The lateral edges of the top covering 50 are beaded as shown at 53, in Fig. 7, and are received in channels 54, secured to the sides of arms 55. The arms 55 are pivoted at 56, to one side of a hinge generally indicated at 57 and 57'. Normally the arms 55 are received in the sides of the van, as shown in Fig. 3, but upon removal of the panels 26, these arms 55 may be moved outward in parallel relation on the hinges 57 and 57', located at the forward and rearward end portions of the van compartment, as shown in Fig. 1, and also tilted downward to provide slope for the roof, as shown in Fig. 8. The arms may be supported intermediate their lengths upon the bars 30, raised to the elevated position shown in Fig. 8, and may be supported also, if desired, upon a round bar 58, mounted upon the panel 26, at the outer edge of the enclosure. A supporting bar 58' is shown also at the inner end of the enclosure to aid in supporting the top covering at each opposite side thereof.

At the lateral edges of the top covering 50 are depending side flaps 59, which extend downward to the panels 19 and 25, and may be secured thereto by rope or lashing generally indicated at 60.

With the parts in the positions shown in Figs. 6 and 8, the structure forms an enclosed compartment for the animal to form a stall or otherwise to confine the horse outside the van for exercise, feeding, rest, etc. When thus confined, the horse can get access to the feed box 42, and the hay rack 40, as well as to the water bucket 44, which parts are accessible upon removal of the panels that form the enclosure. It will be understood that a similar enclosure or stall may be formed at each opposite side of the van to accommodate the respective horses thereof, if more than one is being transported.

After use as an enclosure, the parts may be reassembled to the position shown in Figs. 1 to 4, in the manner that will be obvious from the foregoing description, after which the animals may be transported from place to place.

Thus the van serves not only for conveyance of the animals, accommodating one or more horses according to the size and capacity thereof, but also to provide an exercise and feeding stall or compartment externally of the van when desired, it being capable of transformation for one form to the other, readily and simply.

While the invention has been illustrated and described in one embodiment, it is recognized that variations and changes may be made therein without departing from the invention, except as specified in the claims.

I claim:

1. A van of the character described comprising a vehicle having a van compartment therein adapted to receive an animal, said van compartment including side walls, floor and roof, a plurality of panels extending lengthwise of a side of said compartment separate from the side walls thereof and detachably mounted thereon for removal from the vehicle adapted to form an enclosure beside the vehicle, with the vehicle forming one side of the enclosure, means for anchoring the adjacent portions of the enclosure to the vehicle, and means for detachably connecting said panels together in upright positions to form said enclosure.

2. A van of the character described comprising a vehicle having a van compartment therein adapted to receive an animal, said van compartment including side walls, floor and roof, a plurality of panels extending lengthwise of a side of said compartment separate from the side walls thereof and detachably mounted thereon for removal from the vehicle adapted to form an enclosure beside the vehicle with the vehicle forming one side of the enclosure, means for anchoring the adjacent portions of the enclosure to the vehicle, means for detachably connecting said panels together in upright positions to form said enclosure, and means carried by a side of the vehicle for extension over said enclosure and constructed for anchoring to the upper edges of the panels to form a top covering for the enclosure.

3. A van of the character described comprising a vehicle having a van compartment therein adapted to receive an animal, said van compartment including side walls, floor and roof, a plurality of panels extending lengthwise of a side of said compartment separate from the side walls thereof and detachably mounted thereon for removal from the vehicle adapted to form an enclosure beside the vehicle with the vehicle forming one side of the enclosure, means for anchoring the adjacent portions of the enclosure to the vehicle, means for detachably connecting said panels together in upright positions to form said enclosure, a roll mounted on the vehicle adjacent a side thereof, and a sheet of covering material on said roll adapted for extension over the enclosure to form a top therefor, said sheet having depending flaps thereon constructed for anchoring to the upper edges of the panels and cooperating therewith to form the enclosure.

4. A van of the character described comprising a vehicle having a van compartment therein adapted to receive an animal, said van compartment including side walls, floor and roof, a plurality of panels extending lengthwise of a side of said compartment separate from the side walls thereof and detachably mounted thereon for removal from the vehicle adapted to form an enclosure beside the vehicle with the vehicle forming one side of the enclosure, means for anchoring the adjacent portions of the enclosure to the vehicle, means for detachably connecting said panels together in upright positions to form said enclosure, a roll mounted on the vehicle adjacent a side thereof, a sheet of covering material on said roll adapted for extension over the enclosure to form a top therefor, said sheet having depending flaps thereon constructed for anchoring to the upper edges of the panels and cooperating therewith to form the enclosure, arms pivotally mounted on the vehicle for lateral swinging movement to positions at opposite sides of the enclosure, and means carried by the arms for supporting opposite edges of the sheet of covering material.

5. A van of the character described comprising a vehicle having a van compartment therein adapted to receive an animal, said van compartment including side walls, floor and roof, a plurality of panels extending lengthwise of a side of said compartment separate from the side walls thereof and detachably mounted thereon for removal from the vehicle adapted to form an enclosure beside the vehicle with the vehicle forming one side of the enclosure, means for anchoring the adjacent portions of the enclosure to the vehicle, means for detachably connecting said panels together in upright positions to form said enclosure, each of said panels having a flange on an edge thereof adapted to be set on the ground and having perforations therethrough, and pegs adapted to extend through the perforations into the ground for securing the panels in upstanding relation thereto.

6. A van of the character described comprising a vehicle having a van compartment therein adapted to receive an animal, said van compartment including side walls, floor and roof, a plurality of panels extending lengthwise of a side of said compartment separate from the side walls thereof and detachably mounted thereon for removal from the vehicle adapted to form an enclosure beside the vehicle with the vehicle forming one side of the enclosure, means for anchoring the adjacent portions of the enclosure to the vehicle, means for detachably connecting said panels together in upright positions to form said enclosure, each of said panels comprising a sheet of material having angle bars extending along the upper and lower edges thereof with flanges projecting laterally from said sheet, and upright channels secured to the face of the sheet of each panel and cooperating with the bars to stiffen and reinforce the panel.

7. A van of the character described comprising a vehicle having a van compartment therein adapted to receive an animal, a plurality of panels extending lengthwise of a side of said compartment and detachably mounted thereon for removal from the vehicle adapted to form an enclosure beside the vehicle, means for detachably connecting said panels together about said enclosure, a top covering for the enclosure, an upright guide mounted on the panels at opposite sides of the enclosure, supports extending upwardly from the guide, means for securing the supports in adjusted positions relative to the guide, and means connected with the supports for holding the top covering in place over the enclosure.

8. A van of the character described comprising a vehicle including a vehicle chassis, said chassis including longitudinal and transverse supporting bars, side panels detachably mounted on the chassis in superposed relation to each other, said superposed panels having aligned guides thereon, a bar slidably mounted in the guide of one panel and extending into the guide of the superposed panel to hold the panels in aligned superposed relation, and means for connecting said bar with a cross bar of the chassis frame.

9. A van of the character described comprising a vehicle chassis supporting a van compartment including a floor, side walls and a roof, said side walls including longitudinal bars forming guideways at opposite sides of the compartment, panels detachably mounted in the guideways for removal therefrom, additional panels seated upon the first-mentioned panels and removable from the compartment, and at least one of the panels having an opening therein for access to the compartment.

10. A van of the character described comprising a vehicle chassis having a van compartment mounted thereon and including an enclosure structure, means forming guideways extending lengthwise of the vehicle chassis at opposite sides of the compartment, panels detachably mounted in the guideways, additional panels mounted on the first-mentioned panels in edge to edge relation therewith to be removed therefrom, and guide means connecting the adjacent edges of the panels together for relative sliding movement.

11. A van of the character described comprising a vehicle chassis having an enclosure structure mounted thereon forming a van compartment, said enclosing structure including upright side walls, panels detachably mounted in edge to edge relation and in superposed positions at each respective opposite side of the van compartment and spaced from the adjacent wall thereof, means slidably mounting the panels on the vehicle chassis for detachable separation thereof, and means forming guides between the adjacent edges of the panels for slidably connecting the panels together for relative separation thereof.

12. A van of the character described comprising a vehicle chassis having an enclosure structure mounted thereon forming a van compartment, said enclosing structure including upright side walls, panels detachably mounted in edge to edge relation and in superposed positions at each respective opposite side of the van compartment and spaced from the adjacent wall thereof, means slidably mounting the panels on the vehicle chassis for detachable separation thereof, means forming guides between the adjacent edges of the panels for slidably connecting the panels together for relative separation thereof, and means mounted in the space between the panels and the adjacent side walls for supporting feed for an animal in the compartment, at least one of said panels having an opening therein for access to said feed supporting means.

JOSEPH C. CRIVELLA.

REFERENCES CITED

The following references are of record in the file of this patent:

UNITED STATES PATENTS

| Number | Name | Date |
|---|---|---|
| 181,495 | Street | Aug. 22, 1876 |
| 341,735 | Densmore | May 11, 1886 |
| 427,043 | Burton | May 6, 1890 |
| 467,423 | Merritt | Jan. 19, 1892 |
| 540,084 | Abruzzo | May 28, 1895 |
| 540,594 | Meres | June 4, 1895 |
| 540,866 | Mally | June 11, 1895 |
| 628,175 | Bowdish | July 4, 1899 |
| 667,475 | Winter et al. | Feb. 5, 1901 |
| 1,371,950 | Tracy | Mar. 15, 1921 |
| 2,267,509 | Strong | Dec. 23, 1941 |
| 2,298,530 | Fletcher | Oct. 13, 1942 |
| 2,420,898 | Miner | May 20, 1947 |
| 2,498,647 | Burnam | Feb. 28, 1950 |

FOREIGN PATENTS

| Number | Country | Date |
|---|---|---|
| 222,020 | Great Britain | Sept. 25, 1924 |
| 356,644 | Great Britain | Sept. 10, 1931 |
| 397,967 | Great Britain | Sept. 7, 1933 |
| 461,609 | Great Britain | Feb. 19, 1937 |